United States Patent
Larsson et al.

[15] 3,649,826
[45] Mar. 14, 1972

[54] INTEGRATING ANTILOG FUNCTION GENERATOR

[72] Inventors: Robert W. Larsson, Holliston; Robert L. Scott, Medfield, both of Mass.

[73] Assignee: Corning Glass Works, Corning, N.Y.

[22] Filed: Dec. 22, 1969

[21] Appl. No.: 886,952

[52] U.S. Cl. ................235/197, 235/183, 235/150.53, 324/99 D, 328/142, 328/145, 340/347 NT
[51] Int. Cl. ................................................G06f 7/24
[58] Field of Search......235/183, 197; 340/347 NT, 347 AD; 328/142, 145, 146; 307/227–229; 324/99 D

[56] References Cited

UNITED STATES PATENTS

| 3,428,794 | 2/1969 | Norsworthy | 235/181 |
| 3,305,856 | 2/1967 | Jenkinson | 340/347 |
| 3,316,547 | 4/1967 | Ammann | 340/347 |
| 3,349,390 | 10/1967 | Glassman | 340/347 |
| 3,439,187 | 4/1969 | Strauss | 235/197 |
| 3,440,414 | 4/1969 | Miller | 235/197 |

Primary Examiner—Malcolm A. Morrison
Assistant Examiner—Felix D. Gruber
Attorney—Clarence R. Patty, Jr. and Walter S. Zebrowski

[57] ABSTRACT

An integrating antilog function generator including an analog-to-digital converter for performing two successive dual slope integration routines. During the first integration routine, a time interval related to the magnitude of an unknown signal is determined, and a voltage proportional to the antilog of the unknown signal is generated. During the second integration routine, there is generated an output signal in digital form representative of the antilog of the magnitude of the unknown signal.

29 Claims, 2 Drawing Figures

INVENTORS.
Robert W. Larsson
Robert L. Scott
BY
Walter S. Zebrowski
ATTORNEY

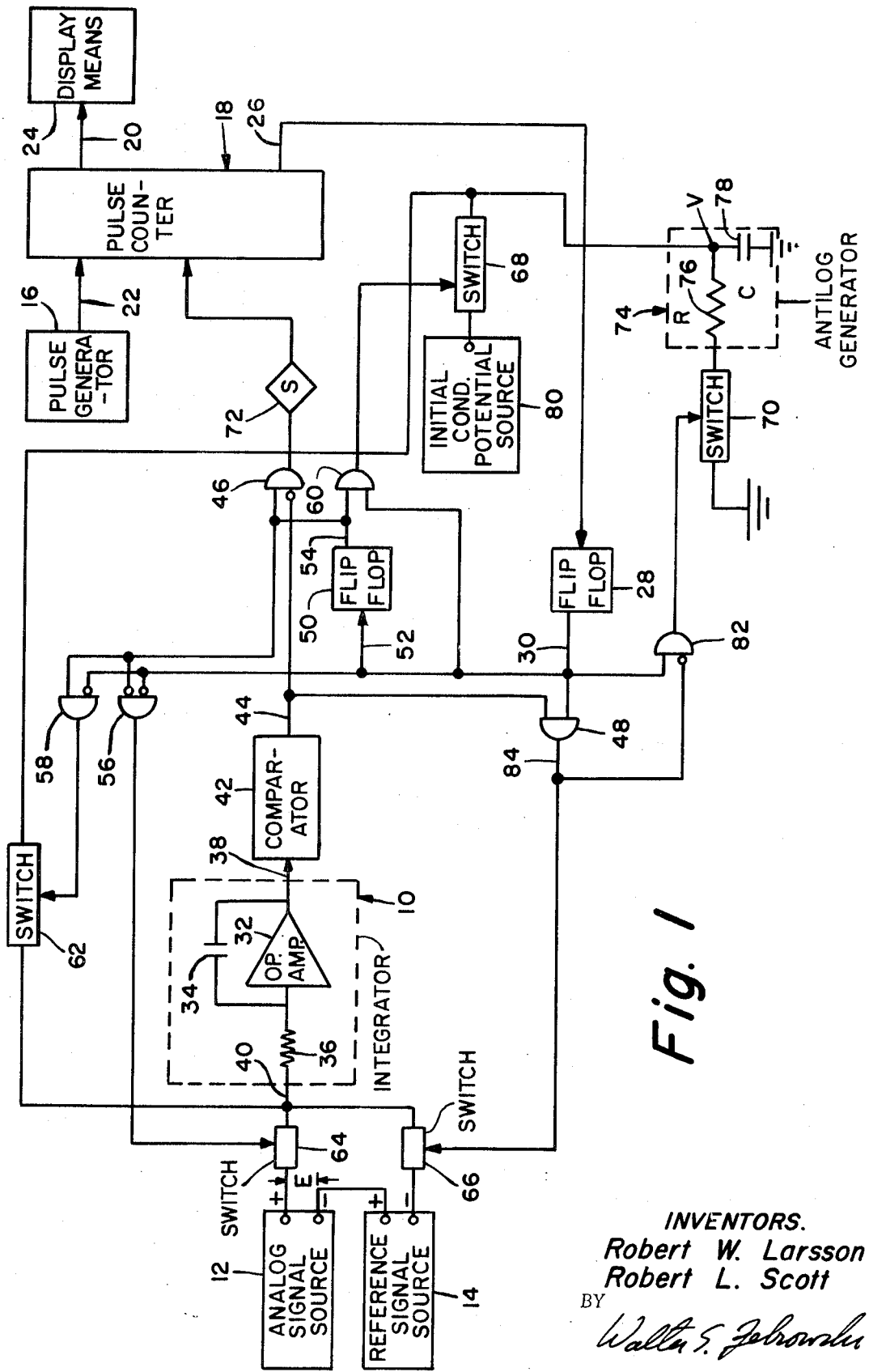

INTEGRATING ANTILOG FUNCTION GENERATOR

BACKGROUND OF THE INVENTION

The concept of dual slope integration in relation to analog-to-digital signal conversion is known to the prior art. In the present invention we employ a dual slope integrating analog-to-digital converter in combination with an exponential function generator and additional logic circuitry connected in such a manner as to provide a digital signal representation of the antilog of the magnitude of an unknown signal. Such a system of instrumentation has particular utility in the chemical and biomedical arts where there is often a need to provide a visual display or an otherwise useable signal, in digital form, representative of the ionic concentration or activity of an aqueous solution. For example, the typical specific ion activity sensor is an electrode which, when immersed into a solution, generates a potential indicative of the logarithm of the specific ion activity thereof. The magnitude of this potential can be displayed with the aid of the usual analog potential metering instrument which in turn may be calibrated to read directly in units of specific ion activity by use of a nonlinear meter scale.

When using a digital instrument, it is often desirable to determine the specific ion concentration or activity of a solution being investigated in which case the output thereof must be converted through the use of log tables, slide rule, or the like. A digital metering instrument which could be employed with the typical pH sensor, as well as other ion sensing electrodes, to provide an output indicative of the ionic concentration or activity of a solution directly, rather than merely the pH thereof or a millivolt reading, would have great utility in a number of scientific investigative fields. Such as instrument eliminates the necessity for approximate and laborious hand and machine calculations and is a great time saver in many instances.

SUMMARY OF THE INVENTION

It is therefore an object of the present invention to provide an integrating antilog function generator capable of high accuracy in which analog signals of unknown magnitude can be converted into digital signals representing the antilog thereof, and to provide the advantages hereinabove noted.

Briefly according to the present invention, an integrating antilog function generator is provided including an analog-to-digital converter. The converter generates a first time period proportional to an unknown potential applied to the input thereof. A means is included for providing a voltage which exponentially decays from a predetermined value in accordance with the equation $V=V_0 e^{-t/RC}$ where $V$ is the exponentially decaying voltage, $V_0$ is the predetermined value of the provided voltage, $t$ is a second time period equal to a fixed time period minus the first time period and is also generated by said converter, and $RC$ is the time constant determining the rate of decay. The resulting voltage is the antilog of the unknown potential.

Additional objects, features, and advantages of the present invention will become apparent to those skilled in the art from the following description and the drawings on which, by way of example, only the preferred embodiment of this invention is illustrated.

BRIEF DESCRIPTION OF THE DRAWINGS

FIG. 1 shows a functional circuit diagram illustrating the preferred embodiment of the integrating antilog function generator of the present invention.

DETAILED DESCRIPTION

Figure 2:
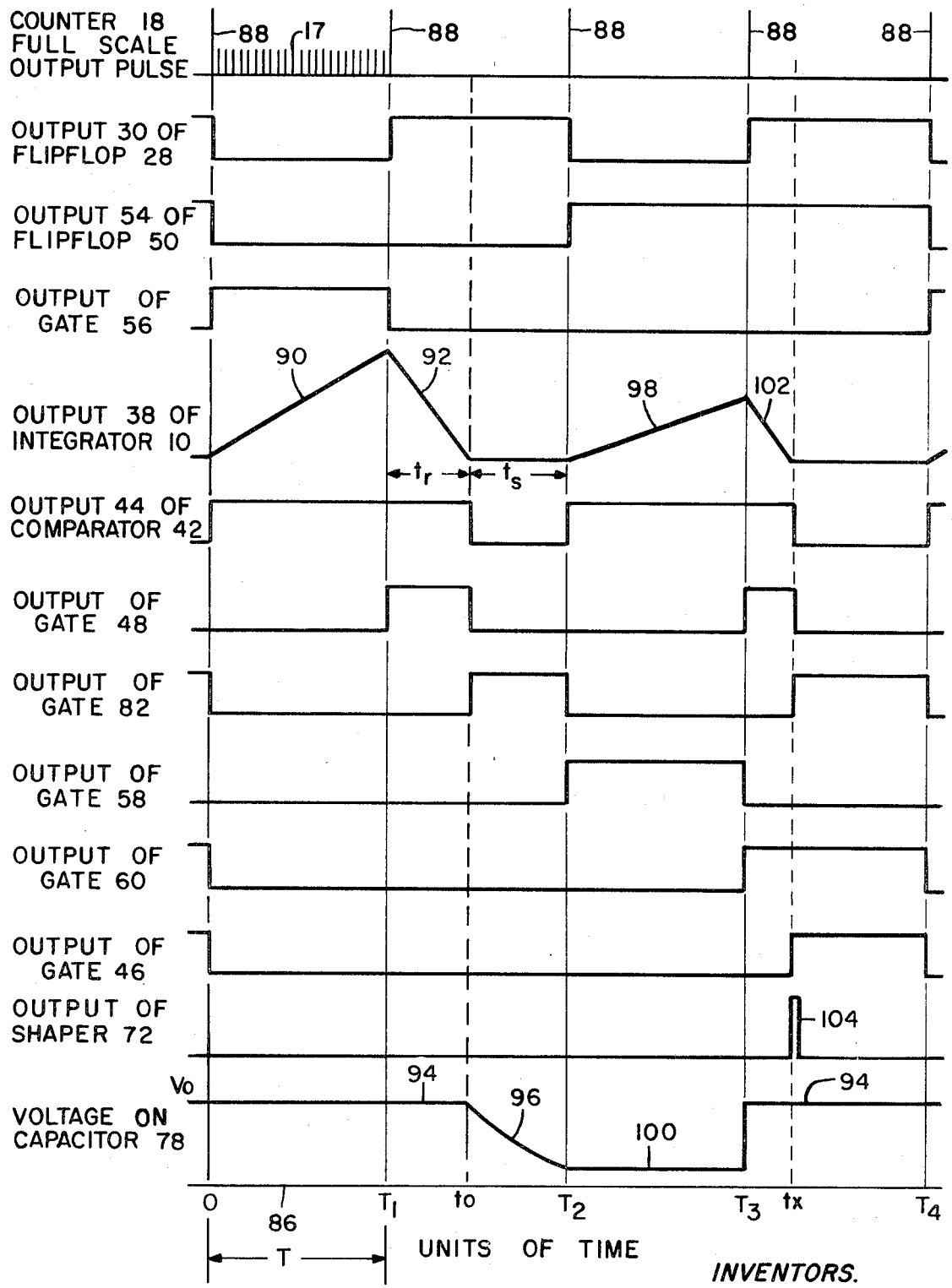
FIG. 2 shows a timing diagram illustrative of the condition of the various components of the circuit of FIG. 1 during a typical operating sequence of the integrating antilog function generator of the present invention.

A complete operating sequence of the circuit of FIG. 1 consists of two integration routines. During the first integration routine, two different potentials are sequentially applied to an integrator 10. The first potential applied during the first integration routine has an initially unknown magnitude and is provided by an analog signal source 12, the digital antilog representation of which is to be determined in accordance with the present invention. The second potential having a predetermined magnitude and a polarity opposite to that of the first potential is provided by reference signal source 14. The object of the first integration routine is to determine a time interval representative of the magnitude of the unknown potential E provided by source 12.

During the second integration routine which follows, there are likewise two separate potentials applied to integrator 10. The first potential applied during the second integration routine, hereinafter referred to as the antilog potential, is generated elsewhere in the circuit during the first integration routine as will later be explained. This potential corresponds to the antilog of the magnitude of the unknown potential provided by source 12. The second potential to be applied to integrator 10 during the second integration routine is, again, the potential provided by reference signal source 14. The object of the second integration routine is to determine a time interval representative of the magnitude of the antilog potential which may thereafter be converted to an equivalent digital signal for display or utilization purposes.

The circuit of FIG. 1 includes a pulse generator 16, such as a free-running multivibrator, or other equivalent well-known means for generating a series of pulses 17 having equal time separations. A sequential pulse counter 18 of the usual type is adapted to provide, either continuously or upon appropriate command, a digital signal at output 20 indicative of the number of pulses applied to input 22 by generator 16 since the start of the most recent counting cycle. A counting cycle is a series of pulses sequentially registered in counter 18 or the elapsed time corresponding thereto, beginning at a predetermined pulse count, proceeding through a maximum pulse count, and ending just prior to reestablishing the predetermined pulse count. A suitable display means 24 or other digital signal utilization device is responsively connected to output 20. Counter 18 is also provided with a full scale output 26 at which is generated a pulse, hereinafter referred to as a full scale pulse, at the end of each counting cycle coincident with the maximum numerical pulse count being registered in counter 18.

Counter 18 may be designed so as to automatically reset itself to a predetermined starting count, such as zero or any other convenient number, upon completion of each counting cycle. In the alternative, counter 18 may have provisions for being reset to the predetermined starting count after each counting cycle is completed by external resetting means, not shown. The automatic reset type of counter is employed in the present example for illustrative purposes only.

The transmission of a pulse train from generator 16 to input 22 may be continuous, as in the present example, such that counter 18 counts continuously through a series of cycles uninterrupted by changes in the condition of the associated external circuitry. In this manner the combination of generator 16 and counter 18 functions as a digital clock which can be used to precisely control events occurring in the external circuitry by means of the full scale pulses generated at regular intervals at output 26.

A main timing flip-flop 28 switches from its currently occupied state to the opposite state each time a full scale pulse is received from output 26. Once having switched, flip-flop 28 remains in the new state until the next succeeding full scale pulse is received, at which time it will again switch to the opposite state. Accordingly, output 30 of flip-flop 28 will exhibit a high potential during every other cycle of counter 18, and a low potential during the intervening cycles. The terms "high" and "low" will be used herein to describe the condition, that is the relative potential level, of the outputs of the various digital devices described.

Main timing flip-flop 28 controls the time duration of each of two separate and distinct dual slope integration routines performed, in part, by integrating circuit or integrator 10. The nature of these two routines is hereinafter explained when a typical operating sequence of the circuit of one embodiment of the present invention is described. Integrator 10 preferably consists of operational amplifier 32, feedback capacitor 34 connected between the output and input of amplifier 32, and resistor 36 in series with the input to amplifier 32. As will be appreciated by those skilled in the art, the integrator or integrating circuit produces a time varying potential at its output 38 representative of the time integral of a potential applied to its input 40. Any circuit which performs this function may be utilized as integrator 10.

Voltage level comparator 42, responsively connected to integrator output 38, is adapted to monitor the voltage level at output 38 of integrator 10 during each of the aforementioned integration routines. This is accomplished by the comparator 42 generating a high potential at output 44 in response to the signal at output 38 passing through a predetermined threshold level in a given direction of potential change. The high-potential signal so generated at output 44 persists until the integrator output signal passes back through the threshold level going in the opposite direction of potential change at which time the signal at output 44 goes low. Output 44 of comparator 42 is, in turn, connected in energizing relation to one input of counter strobe AND gate 46, and one input of reference input gate 48.

Flip-flop 50 enables the circuit to determine which of the two integration routines to execute during a given phase of its operating sequence. The clock input terminal 52 of flip-flop 50 is connected to output 30 of flip-flop 28. Output 54 of flip-flop 50 will switch from the most recently occupied level, either high or low, to the opposite level each time the signal at output 30 of flip-flop 28 goes from high to low. However, the signal level at output 54 will not change when the signal at output 30 of flip-flop 28 goes from low to high. Thus, the frequency of the change of state of flip-flop 50 is exactly one-half the frequency of the change of state of flip-flop 28. Flip-flop 50 therefore acts as a frequency divider with respect to the frequency of operation of main timing flip-flop 28. Accordingly, output 54 is low during the first and second cycles of counter 18 thereby permitting the first integration routine of the sequence to proceed. During the third and fourth cycles of counter 18, output 54 is high thereby permitting the second integration routine of the sequence to proceed.

Output 54 of flip-flop 50 is connected to an input of analog signal input gate 56, an input of antilog integrate gate 58, and an input of antilog reset AND-gate 60. Output 54 is also connected to an input of counter strobe gate 46. It will become apparent that analog signal source 12 is electrically connected to input 40 of integrator 10 only during the time interval during which output 30 of flip-flop 28 and output 54 of flip-flop 50 are simultaneously low, these two conditions being necessary to activate analog signal input gate 56. Such conditions exist only during the first cycle of the four-cycle operating sequence of the circuit. Similarly, it will be noted that the antilog signal is connected through switch 62 to input 40 only during the time interval during which output 30 of flip-flop 28 is low and output 54 of flip-flop 50 is high, these latter two conditions being necessary to activate antilog integrate gate 58. The latter conditions exist only during the third cycle of the four-cycle sequence. Switch 62 and switches 64, 66, 68, and 70 may be field effect transistors to provide fast operation; however, other types of switches may be used and one familiar with the art may readily select a suitable switch.

Counter 18 is responsive to counter strobe gate 46 which causes the digital information contained in counter 18 to be transferred via output 20 to display means 24 at the precise time that output 44 of comparator 42 goes from high to low provided that, at the same time, output 54 of flip-flop 50 is high. These conditions can occur only during the fourth cycle of the operating sequence at the instant when the number in counter 18 is representative of the magnitude of the antilog potential. Since counter strobe gate 46 remains active from the time the aforementioned conditions occur until the conclusion of the fourth cycle of the sequence, shaper 72, a conventional pulse shaping or generating circuit, is utilized between gate 46 and counter 18. As is well known to those skilled in the art, such a shaper emits a pulse of short duration only at the instant a signal provided to its input increases its level abruptly, as from a low to a high level. The persistance of the signal at a high level at the input to shaper 72 is of no further consequence with respect to further activity of the shaper output. It is important that the pulse emitted by shaper 72 in response to counter strobe gate 46 going from a low to a high condition, be of no greater time duration than that of a single pulse generated by pulse generator 16, and preferably less. This helps to insure that the information contained in the counter will not change during the period of its display or utilization. If the pulse emitted by shaper 72 persisted for a time interval which overlapped two or more pulses generated by generator 16, the information contained in counter 18 would change while display is in progress. As a result, the information displayed would be subject to inaccurate interpretation.

A potential representative of the antilog of the signal of source 12 is generated in RC network 74 consisting of resistor 76 and capacitor 78 connected together as shown, the combination of which may have any predetermined time constant. A potential of predetermined magnitude is initially established across capacitor 78 by initial condition potential source 80 applied across capacitor 78 to ground through switch 68, the position of which is controlled by antilog reset gate 60. The antilog potential is generated by permitting capacitor 78 to discharge to ground through resistor 76 and switch 70 over a precise time interval controlled by antilog generate AND-gate 82. Antilog generate gate 82, having one input connected to output 30 of flip-flop 28 and the other input connected to output 84 of reference input gate 48, is active during a portion of the second cycle of the operating sequence during which output 30 is high and output 84 of reference input gate 48 is low. Accordingly, during this period of activity of antilog generate gate 82, switch 70 is closed and capacitor 78 is discharging exponentially from its initial condition potential. As will be hereinafter described, source 80 is disconnected from network 74 during this period so that an exponential discharge of capacitor 78 can take place. At the conclusion of the second cycle, the potential across capacitor 78 represents the desired antilog of the potential supplied by source 12 and must therefore be preserved until it can be measured during the immediately following second integration routine. To accomplish this antilog generate gate 82 is deactivated to open switch 70 and isolate the charge remaining on capacitor 78.

For a better understanding of the present invention, a typical operating sequence of the circuit of FIG. 1 will now be explained with reference also being made to the timing diagram shown in FIG. 2.

A single operating sequence of the circuit of the present example spans the time interval of four successive counting cycles of counter 18, beginning at time "0" when analog signal source 12 is connected to integrator 10, and ending four counter cycles later at time $T_4$ when the circuit conditions again return to the conditions at time "0" in preparation for a new sequence. Time axis 86 of the diagram is therefore divided into four equal time intervals T each representing one of the cycles of counter 18 occurring in a typical sequence. Assume, for illustrative purposes, that the first counting cycle of the sequence is chosen so that immediately prior to time "0" the conditions of output 30 of flip-flop 28 and output 54 of flip-flop 50 are high.

At time "0" a full scale pulse 88 is generated at output 26 which switches flip-flop 28 so that output 30 goes low, thus switching flip-flop 50 so that output 54 thereof also goes low. These conditions activate analog signal input gate 56 the inputs of which are connected to the outputs of flip-flops 28 and 50. Gate 56 closes switch 64 to connect analog source 12 to input 40 of integrator 10. No other gates controlling the connection of potentials to integrator 10 are active under the aforementioned conditions. Accordingly, assuming that the unknown potential of source 12 is of constant magnitude and polarity, integrator 10 generates at output 38 a linearly increasing potential 90 proportional to the time integral of the potential at input 40. Integration of the signal potential from analog source 12 proceeds throughout the first counting cycle until, at the start of the second cycle at time $T_1$, counter 18 emits another full scale pulse 88 at output 26.

At time $T_1$, the full scale counter pulse switches flip-flop 28 and its output 30 goes high. It will be observed from the waveforms of FIG. 2 that since output 30 goes from low to high, a corresponding change in the condition of the input to flip-flop 50 does not alter the low condition of output 54. It will also be observed that the condition of output 44 of comparator 42, which has been high during the first cycle due to the positive potential 90 at output 38, also remains high. Due to the change in state of flip-flop 28, analog signal gate 56 is deactivated thereby removing the signal from source 12 from input 40 of integrator 10, and the output of reference signal input gate 48 goes high since the outputs from comparator 42 and flip-flop 28 are connected to gate 48, which operates switch 66. Reference source 14 is therefore connected to input 40. The polarity of reference source 14 being opposite to that of analog source 12, potential 92 at output 38 of integrator 10 now decreases linearly with time. At time $t_o$ the potential at output 38 reaches the threshold level of comparator 42 at which time comparator output 44 goes low. The integrator output level remains at the threshold voltage for the remainder of the second cycle. Those skilled in the art will appreciate that the time interval $t_r$ between $T_1$ and $t_o$ is proportional to the magnitude of the unknown potential of the signal from source 12. Time interval $t_r$ must be determined before the antilog potential of the input signal can be generated. Thus the number contained in counter 18 at time $t_o$ is representative of that magnitude and can be displayed or otherwise utilized if desired.

When output 44 of comparator 42 goes low, the output of reference gate 48 goes low thus opening switch 66 and disconnecting reference source 14 from integrator 10. The remaining portion of the second cycle, which is illustrated as time period $t_s$, is utilized to generate the antilog of the unknown potential E of source 12.

As output 84 of reference signal gate 48 goes low at time $t_o$, output 30 of flip-flop 28 still being high, the output of antilog generate gate 82 goes high thereby closing switch 70 and permitting initial condition potential 94 previously developed across capacitor 78 to discharge through resistor 76 to ground. Such voltage discharging, illustrated by numeral 96, continues at an exponential rate for a period of time $t_s(T_2-t_o)$ until the end of the second counting cycle at time $T_2$.

The second integration routine begins at the start of a third cycle of counter 18 at which time the antilog potential generated during the preceding cycle is applied to input 40 of integrator 10 through switch 62, the position of which is controlled by antilog integrate AND-gate 58.

At time $T_2$ the voltage across the capacitor 78 corresponds to the antilog of the unknown potential of the source 12. To preserve this voltage so that it can be determined during the second integration routine to follow, the full scale pulse 88 occurring at time $T_2$ switches flip-flop 28, causing output 30 to go low, thus deactivating antilog generate gate 82, opening switch 70, and isolating the charge presently existing on capacitor 78. As a result of output 30 going from high to low, the output of flip-flop 50 goes high.

The conditions are now met to activate antilog integrate gate 58, close switch 62 and thereby apply the antilog potential across capacitor 78 to integrator 10. The second integration routine, which provides a digital representation of the antilog potential, is now under way and will continue for two counter cycles, ending at time $T_4$. Potential 98 at output 38 of the integrator 10 increases as the time integral of potential 100 across capacitor 78. Since this change is positive, output 44 of comparator 42 goes high and keeps counter strobe gate 46 inactive. Integration continues until counter 18 reaches full scale at the conclusion of the third cycle at time $T_3$.

At time $T_3$ a full scale pulse 88 is provided at output 26 switching flip-flop 28 and causing output 30 to go high. Output 44 of comparator 42 and output 54 of flip-flop 50 remain high. These conditions cause the antilog integrate gate 58 to deactivate thereby opening switch 62 and stopping integration of antilog potential 100 on capacitor 78. Since potential 100 has now been fully utilized at time $T_3$, capacitor 78 may now be recharged to its initial condition potential 94 so as to be prepared to discharge once again during the next operating sequence. To effect charging of capacitor 78, the output of antilog reset gate 60 goes high in response to the present conditions of flip-flops 28 and 50 at time $T_3$, thereby closing switch 68 to connect source 80 directly across capacitor 78 to ground. Capacitor 78 is recharged to its initial condition potential 94 virtually instantaneously and remains in a recharged condition until time $t_o$ in the second counter cycle of the next sequence.

At time $T_3$, reference gate 48 is activated for the second time during the present sequence. Switch 66 closes and reference source 14 is connected to integrator 10 once again such that potential 102 at output 38 proceeds to decrease at a linear rate with respect to time. At a time $t_x$ during the fourth counter cycle, potential 102 at output 38 will pass through the threshold level of comparator 42, depending on the magnitude of antilog potential 100, causing comparator output 44 to go low. At time $t_x$, the digital quantity contained in counter 18 is representative of the magnitude of antilog potential 100. In order to effect the display of that quantity, the output of counter strobe gate 46 goes high since at time $t_x$, the outputs of comparator 42 and flip-flop 50 are low and high, respectively. The positive going signal from gate 46 causes shaper 72 to emit a pulse 104 in response to which said digital quantity contained in counter 18 at time $t_x$ is transferred to display means 24.

That RC network 74 provides a voltage $V$ that is a function of the antilog of the potential supplied by analog signal source 12, which potential is referred to as $E$, will become apparent from the following derivation. In connection with the description of FIG. 2, it was shown that time period $t_r$ is proportional to signal potential $E$ which is received by the circuit of FIG. 1. RC network 74 is discharged from a given voltage level $V_o$ for a time period $t_s$ which is equal to one counting cycle $(T_2-T_1)$ minus the time period $t_r$. The voltage remaining on capacitor 78 at the end of period $t_s$ is described by the equation $$V = V_o e^{-t_s/RC} \qquad (1)$$

where RC is the time constant of the rate of decay of $V$ as determined by the resistance of resistor 76 and capacitance of capacitor 78. Although said time constant is determined by RC network 74 in the present example, it may be determined by any exponentially varying source known to one familiar with the art. In order to show that voltage $V$ is related to the antilog of input signal potential $E$, potential $E$ is expressed as follows $$E = K_1 + K_2 \log A \qquad (2)$$

where $A$ is the desired resultant voltage which corresponds to that developed by RC network 74. Equation (2) can be rewritten $$\log A = (E - K_1)/K_2 \qquad (3)$$

therefore, $$A = 10^{(E-K_1)/K} \qquad (4)$$

Since $\log A = \ln A \log e$, then from (3):

$$\ln A = (E-K_1)/K_2 \log e \qquad (5)$$

or, $$\ln A = (E-K_1)/K_3 \qquad (6)$$

where $K_3 = K_2 \log e$. Thus $$A = e^{(E-K_1)/K} \qquad (7)$$

Referring to FIG. 2, the maximum amplitude of the integrator voltage represented by linearly increasing potential 90 is proportional to the analog input signal potential E supplied by source 12. The following equation describing the potential represented by reference numeral 92 can be written.

$$t_r = K_5(E - K_1).$$

This means that time period $t_r$ is linearly related to $E$ with an offset $K_1$ and slope $K_5$. By starting the decay of the voltage across capacitor 78 at time $t_0$, which is the end of time period $t_r$, and continuing to the fixed time $T_2$, and then opening switch 70, capacitor 78 discharges for time interval $t_s$. For the sake of simplicity, let $t_{fs} = T_2 - T_1$. Therefore, $$t_s = t_{fs} - t_r. \quad (9)$$

Equation (1) can be rewritten $$V = V_o e^{-(t - t)/RC} \quad (10)$$

or, $$V = V_o e^{-t/RC} e^{t/RC} \quad (11)$$

therefore, $$V = K_6 e^{t/RC} \quad (12)$$

where $K_6 = V_o e^{-t_{fs}/RC}$. Substituting equation (8) into equation (12)

$$V = K_6 e^{K(E - K_1)/RC} \quad (13)$$
$$V = K_6 e^{(E - K_3)/K_3} \quad (14)$$

where $RC = K_3 K_5$. Equation (14) is the same form as equation (7) except for constant $K_6$ which can be selected as desired by adjusting circuit parameters.

By proper selection of circuit parameters, the voltage across capacitor 78 can be made proportional to the antilog of the potential supplied by analog signal source 12. Some of the circuit parameters which can be varied are resistor 76, capacitor 78 and the potential of the source 80.

The time period between $t_x$ and $T_4$ corresponds to the additional circuit capacity available to determine the magnitude of larger antilog potentials than that of the present example. At time $T_4$, the conclusion of the fourth cycle, a full scale pulse 88 is generated at output 26 which switches flip-flop 28 to its low output state which in turn switches output 54 of flip-flop 50 to its low state. These conditions are identical with those which previously occurred at time "0," and the circuit is ready to begin a new sequence similar to the sequence just concluded.

Although the present invention has been described with respect to specific details of a certain embodiment thereof, it is not intended that such details be limitations on the scope of the instant invention except insofar as set forth in the following claims.

We claim:

1. An integrating antilog function generator comprising
an analog-to-digital converter,
means for applying an unknown potential to the input of said analog-to-digital converter, said analog-to-digital converter including means for establishing a first time period proportional to the magnitude of said unknown potential,
means responsive to said converter for establishing a second time period equal to a fixed time interval minus said first time period, and means responsive to said converter for generating a voltage which exponentially decays from a predetermined value in accordance with the equation $V = V_o e^{-t/RC}$, where $V$ is the exponentially decaying voltage, $V_o$ is the predetermined value of the provided voltage, $t$ is said second time period, and $RC$ is the time constant determining the rate of decay,
the value of $V$ at the end of said second time period being the antilog of said unknown potential.

2. The integrating antilog function generator of claim 1 further comprising means responsively connected to said means for establishing said second time period for preventing further exponential decay of said decaying voltage at the end of said second time period.

3. The integrating antilog function generator of claim 1 further comprising means cooperatively associated with said means for generating and responsively connected to said converter for applying said decayed voltage from said means for generating to the input of said analog to digital converter, the converter output being a digital representation of the antilog of said unknown potential.

4. The integrating antilog function generator of claim 1 further comprising means for inhibiting a digital representation of said unknown potential at the output from said analog-to-digital converter.

5. The integrating antilog function generator of claim 1 wherein said analog-to-digital converter includes
integrating means for generating an output signal proportional to the time integral of an input signal applied thereto, and
comparator means responsively connected to said integrating means for providing a first signal at the output thereof when the integrator output signal is above a predetermined threshold level and a second signal when the integrator output signal is below said predetermined threshold level.

6. The integrating antilog function generator of claim 5 wherein said integrating means comprise
an operational amplifier,
a feedback capacitor connected between the output and input of said amplifier, and
a resistor connected in series with said input of said amplifier.

7. The integrating antilog function generator of claim 1 wherein said means for generating a voltage include an RC network comprising a resistance and a capacitance.

8. The integrating antilog function generator of claim 7 further comprising means connected to said resistance for discharging said capacitance from said predetermined initial voltage $V_o$ through said resistance during said second time period.

9. The integrating antilog function generator of claim 8 wherein said means for discharging include a switch connected in series with said resistance.

10. The integrating antilog function generator of claim 7 further comprising means cooperatively associated with said RC network for charging said capacitance to said predetermined initial voltage $V_o$.

11. The integrating antilog function generator of claim 1 wherein said analog to digital converter includes
a pulse generator,
a pulse counter connected to said pulse generator, and
display means connected to said pulse counter.

12. The integrating antilog function generator of claim 11 wherein said analog to digital converter further includes
integrating means for generating an output signal proportional to the time integral of an input signal applied thereto, and comparator means responsively connected to said integrating means for providing a first signal level at the output thereof when the integrator output signal is above a predetermined threshold level and a second signal level when the integrator output signal is below said predetermined threshold level.

13. The integrating antilog function generator of claim 12 further comprising
means responsively connected to said means for establishing said second time period for preventing further exponential decay of said decaying voltage at the end of said second time period,
means for inhibiting a digital representation of said unknown potential at the output from said analog-to-digital converter, and
means cooperatively associated with said means for generating a voltage and responsively connected to said converter for applying said decayed voltage from said means for generating a voltage to the input of said integrating means,
the converter output being the antilog of said unknown potential and being digitally displayed on said display means.

14. An integrating antilog function generator comprising
pulse generating means for generating a series of equal time pulses, pulse counting means responsively connected to said pulse generating means for producing a digital output signal representative of the number of pulses applied to its input and for providing signals to establish first, second, third, and fourth successive equal fixed time intervals, integrating means for generating an output signal applied thereto, comparator means responsively connected to said integrating means for providing a first signal at the output thereof when the integrator output signal is above a predetermined threshold level and a second signal when the integrator output signal is below said predetermined threshold level, means for applying an unknown potential to the input of said integrating means during said first fixed time interval, means for applying a known potential to the input of said integrating means at the start of said second fixed time interval for a first time period proportional to the magnitude of said unknown potential, an *RC* network including a resistance and a capacitance having a predetermined time constant, means cooperatively associated with said *RC* network for charging said capacitance to a predetermined initial voltage $V_o$, means responsive to said comparator means for exponentially discharging said capacitance from said predetermined initial voltage $V_o$ through said resistance in accordance with the equation $V=V_o e^{-t/RC}$, where $V$ is the exponentially decaying voltage, $t$ is a second time period equal to said second fixed time interval minus said first time period, and $RC$ is the time constant determining the rate of decay, the value of $V$ at the end of said second time period being the antilog of said unknown potential, means cooperatively associated with said *RC* network and responsively connected to said pulse counting means for applying said decayed voltage to the input of said integrating means at the start of said third fixed time interval, and means responsive to the output of said comparator for providing a signal to said pulse counting means during said fourth fixed time interval, the corresponding output from said pulse counting means during said fourth fixed time interval being a digital representation of the antilog of said unknown potential.

15. The integrating antilog function generator of claim 14 further comprising means responsive to said pulse counting means for discontinuing further exponential decay of said decaying voltage at the end of said second time period.

16. The integrating antilog function generator of claim 15 further comprising a frequency dividing means, the input of which is responsively connected to said pulse counting means.

17. The integrating antilog function generator of claim 16 wherein said means for providing a signal to said pulse counting means comprise a counter strobe AND gate responsively connected to said comparator and frequency dividing means, and a pulse shaper connected between the output of said counter strobe gate and said pulse counting means, said shaper being adapted to activate said pulse counting means to produce said digital output signal.

18. The integrating antilog function generator of claim 14 further comprising means for inhibiting a digital representation of said unknown potential at the output from said pulse counting means.

19. The integrating antilog function generator of claim 14 wherein said integrating means comprise an operational amplifier, a feedback capacitor connected between the output and input of said amplifier, and a resistor connected in series with said input to said amplifier.

20. The integrating antilog function generator of claim 14 further comprising a frequency dividing means, the input of which is responsively connected to said pulse counting means.

21. The integrating antilog function generator of claim 20 wherein said frequency dividing means is a flip-flop.

22. The integrating antilog function generator of claim 14 wherein said means for applying an unknown potential comprise a first switch connected in series with the input to said integrating means, and a first AND gate operatively associated with said first switch and responsively connected to said pulse counting means.

23. The integrating antilog function generator of claim 22 wherein said means for applying a known potential comprise a second switch connected in series with the input to said integrating means, and a second AND gate operatively associated with said second switch and responsively connected to said pulse counting means and said comparator means.

24. The integrating antilog function generator of claim 14 wherein said means for discharging said capacitance comprise a third switch series connected to said resistance, and a third AND gate operatively associated with said third switch and responsively connected to said comparator means.

25. The integrating antilog function generator of claim 14 wherein said means for applying said decayed voltage to said integrating means comprise a fourth switch series connected between the input to said integrating means and said capacitance, and a fourth AND gate operatively associated with said fourth switch and responsively connected to said pulse counting means.

26. The integrating antilog function generator of claim 20 wherein said means for providing a signal to said pulse counting means comprise a counter strobe AND gate responsively connected to said comparator and frequency dividing means, and a pulse shaper connected between the output of said counter strobe gate and said pulse counting means, said shaper being adapted to activate said pulse counting means to produce said digital output signal.

27. The integrating antilog function generator of claim 26 further comprising means responsive to said pulse counting means for discontinuing further exponential decay of said decaying voltage at the end of said second time period.

28. The integrating antilog function generator of claim 27 wherein said means for applying an unknown potential comprise a first switch connected in series with the input to said integrating means, and a first AND gate operatively associated with said first switch and responsively connected to said pulse counting means, wherein the means for applying a known potential comprise a second switch connected in series with the input to said integrating means, and a second AND gate operatively associated with said second switch and responsively connected to said pulse counting means and said comparator means, wherein said means for discharging said capacitance comprise a third switch series connected to said resistance, and a third AND gate operatively associated with said third switch and responsively connected to said comparator means, and wherein said means for applying said decayed voltage to said integrating means comprise a fourth switch series connected between the input to said integrating means and said capacitance, and a fourth AND gate operatively associated with said fourth switch and responsively connected to said pulse counting means.

29. An integrating antilog function generator comprising an analog-to-digital converter, means for applying an unknown potential to the input of said analog-to-digital converter, said analog-to-digital converter including means for establishing a first time period proportional to the magnitude of said unknown potential, means responsive to said converter for establishing a second time period equal to a fixed time interval minus said first time period, and means responsive to said converter for providing a voltage in accordance with the equation $V = V_o e^{-t/RC}$, where $V$ is the value of said voltage at the end of said second time period, $V_o$ is the value of a predetermined constant voltage, t is said second time period, and $R$ and $C$ are constants, the value of $V$ at the end of said second time period being the antilog of said unknown potential.

* * * * *

PO-1050
(5/69)

UNITED STATES PATENT OFFICE
CERTIFICATE OF CORRECTION

Patent No. 3,649,826                    Dated  March 14, 1972

Inventor(s)  Robert W. Larsson and Robert L. Scott

It is certified that error appears in the above-identified patent and that said Letters Patent are hereby corrected as shown below:

Column 1, line 32, "as" should be -- an --.

Column 6, line 66, equation 4 to read as follows:

$$A = 10^{(E - K_1)/K_2}$$

line 72, equation 7 to read as follows:

$$A = e^{(E - K_1)/K_3}$$

Column 7, line 3, insert -- (8) --; line 14, equation 10 to read as follows:

$$V = V_0 e^{-(t_{fs} - t_r)/RC}$$

line 16, equation 11 to read as follows:

$$V = V_0 e^{-t_{fs}/RC} e^{t_r/RC}$$

line 18, equation 12 to read as follows:

$$V = K_6 e^{t_r/RC}$$

lines 22 and 23, equations 13 and 14 to read as follows:

$$V = K_6 e^{K_5(E - K_1)/RC} \qquad (13)$$

$$V = K_6 e^{(E - K_1)/K_3} \qquad (14)$$

Signed and sealed this 6th day of March 1973.

(SEAL)
Attest:

EDWARD M. FLETCHER, JR.
Attesting Officer

ROBERT GOTTSCHALK
Commissioner of Patents